(12) United States Patent
Hirata et al.

(10) Patent No.: US 8,003,203 B2
(45) Date of Patent: *Aug. 23, 2011

(54) RESINOUS OIL-RETAINING ARTICLE AND METHOD FOR PRODUCTION THEREOF

(75) Inventors: Masakazu Hirata, Osaka (JP); Hideyuki Tsutsui, Kuwana (JP)

(73) Assignee: NTN Corporation, Osaka (JP)

( * ) Notice: Subject to any disclaimer, the term of this patent is extended or adjusted under 35 U.S.C. 154(b) by 607 days.

This patent is subject to a terminal disclaimer.

(21) Appl. No.: 11/884,042

(22) PCT Filed: Mar. 1, 2006

(86) PCT No.: PCT/JP2006/303851
§ 371 (c)(1),
(2), (4) Date: Aug. 8, 2007

(87) PCT Pub. No.: WO2006/093181
PCT Pub. Date: Sep. 8, 2006

(65) Prior Publication Data
US 2008/0260980 A1   Oct. 23, 2008

(30) Foreign Application Priority Data

Apr. 3, 2005   (JP) ................. 2005-060836

(51) Int. Cl.
*B32B 5/16* (2006.01)
*C08J 9/26* (2006.01)
(52) U.S. Cl. ............... 428/308.4; 428/305.5; 428/306.6; 428/315.5; 428/315.7; 521/61; 521/63; 384/527
(58) Field of Classification Search ............... 428/305.5, 428/306.6, 308.4, 315.5, 315.7; 521/61, 521/63; 384/527
See application file for complete search history.

(56) References Cited

U.S. PATENT DOCUMENTS

| | | | | |
|---|---|---|---|---|
| 4,196,070 A * | 4/1980 | Chao et al. | ..................... | 204/266 |
| 4,226,886 A * | 10/1980 | Lakes | ........................ | 428/315.7 |
| 5,185,111 A * | 2/1993 | Lazar | ............................... | 264/49 |
| 2007/0232502 A1* | 10/2007 | Tsutsui et al. | ................ | 508/104 |
| 2008/0032112 A1* | 2/2008 | Hirata et al. | ............... | 428/304.4 |
| 2008/0085070 A1* | 4/2008 | Hirata et al. | .................. | 384/470 |
| 2010/0247013 A1* | 9/2010 | Hirata et al. | .................. | 384/469 |

FOREIGN PATENT DOCUMENTS

| | | |
|---|---|---|
| JP | 06-041569 | 2/1994 |
| JP | 08-188667 | 7/1996 |
| JP | 10-316794 | 12/1998 |
| JP | 11-060787 | 3/1999 |
| JP | 11-060788 | 3/1999 |
| JP | 11-166541 | 6/1999 |
| JP | 2000-071243 | 3/2000 |
| JP | 2000-071244 | 3/2000 |
| JP | 2001-81227 | 3/2001 |
| JP | 2002-129183 | 5/2002 |
| JP | 2003-026851 | 1/2003 |
| JP | 2005-330474 | 12/2005 |
| WO | WO 2005121288 A1 * | 12/2005 |

* cited by examiner

*Primary Examiner* — Hai Vo

(74) *Attorney, Agent, or Firm* — Hedman & Costigan, P.C.; James V. Costigan

(57) ABSTRACT

The present invention provides a porous resinous oil-retaining article, containing lubricating oil, which is excellent in the utilization efficiency of the lubricating oil, has a high mechanical strength, and further allows the resin and the lubricating oil to be combined with each other according to a use and a specification. The present invention also provides a method of producing the resinous oil-retaining article. The resinous oil-retaining article comprises a resinous porous article having interconnected holes which are open to a surface of the resinous porous article; and an oil impregnated into the resinous porous article. The interconnected holes are formed by molding a resin containing a pore-forming substance into a molding and extracting a part of the pore-forming substance from the molding with a solvent which dissolves the pore-forming substance and does not dissolve the resin. An interconnected hole porosity of the resinous porous article is not more than 30%.

12 Claims, 1 Drawing Sheet

RESINOUS OIL-RETAINING ARTICLE AND METHOD FOR PRODUCTION THEREOF

TECHNICAL FIELD

The present invention relates to a resinous oil-retaining article and a method for producing the resinous oil-retaining article and more particularly to a resinous oil-retaining article which can be used as a feeder of lubricating oil and a method for producing the resinous oil-retaining article.

BACKGROUND ART

As one of methods of improving the frictional wear property of a resinous article, so-called "gan-pla," which is made by adding lubricating oil to resinous material, is known. In this method, the resin and the lubricating oil are melted, kneaded, pelletized to obtain a mixture thereof having a certain configuration, and injection-molded or extrusion-molded. The amount of the lubricating oil which can be added to the resin is up to about 10 vol % to prevent deterioration of the injection moldability. Because the resin and the lubricating oil are melted and kneaded, the resinous material has a high uniformity and oil-retaining performance, and the lubricating oil little bleeds out to the surface thereof. Therefore the function of the resinous article in feeding the lubricating oil is insufficient. Further when the resinous article is used as a sliding bearing, a sufficient lubricating performance is not obtained in a region in which a PV value which is the product of a load (P) and a sliding speed (V) is high.

Heretofore as an oil-containing resin, developed to solve the above-described problem, which is a mixture of resin and lubricating oil to be molded into a predetermined configuration, the composition containing the ultra-high-molecular-weight polyethylene and grease is disclosed (see patent document 1). Because the grease of the composition prevents the lubricating oil from flowing, the lubricating oil can be contained in the resin at not less than 50 vol %. The amount of bleeding of the lubricating oil to the surface of the composition is larger than the amount of bleeding of the lubricating oil to the surface of the resinous article formed by the gan-pla.

There is disclosed the oil-containing resin to which the fibrous oil guide article is added (see patent documents 2 through 4); the lubricating oil retained by the porous silica is mixed with the synthetic resin to obtain the oil-containing resin (see patent document 5). These oil-containing resins are intended to successively feed the surface of the resin with the lubricating oil. Owing to the help of the guide material and the porous silica, the amount of the lubricating oil that can be contained in the resin is increased to about 20 vol %.

In the patent document 1, however, although a sufficient amount of the oil is secured, the composition has a high oil-retaining performance, and a utilization efficiency of the added lubricating oil is low because the composition is of an incorporating type of preliminarily mixing the resin and the lubricating oil with each other. And another problem is that the mechanical strength of the oil-containing resinous article is low because it contains a large amount of lubricating oil.

In the oil-containing resins disclosed in the patent documents 2, 3, 4, and 5, as described above, owing to the oil guide materials and the porous silica, the amount of the lubricating oil in the resin is increased to about 20 vol %. Further owing to the addition of the reinforcing agent, a decrease of the mechanical strength of the oil-containing resins can be restrained. But when the oil-containing resins are applied to a retainer of a bearing to lubricate it with only the oil in the resin, there occur problems that the amount of the lubricating oil is insufficient and that the bleeding speed thereof to the surface is low.

Further the methods disclosed in the patent documents 1 through 5 are intended to shape the preliminarily kneaded resin and lubricating oil into predetermined configurations and, therefore, the methods have a limitation in the combination of the resin and the lubricating oil and are unapplicable to a wide range of use.

Patent document 1: Japanese Patent Application Laid-Open No. 6-41569
Patent document 2: Japanese Patent Application Laid-Open No. 11-166541
Patent document 3: Japanese Patent Application Laid-Open No. 2000-71243
Patent document 4: Japanese Patent Application Laid-Open No. 2000-71244
Patent document 5: Japanese Patent Application Laid-Open No. 2002-129183

DISCLOSURE OF THE INVENTION

Problem to be Solved by the Invention

The present invention has been made to solve the above-described problems. It is an object of the present invention to provide a porous resinous oil-retaining article, containing lubricating oil, which is excellent in the utilization efficiency of the lubricating oil, has a high mechanical strength, and further allows the resin and the lubricating oil to be combined with each other according to a use and a specification; and a method of producing the resinous oil-retaining article.

Means for Solving the Problems

A resinous oil-retaining article of the present invention comprises a resinous porous article having interconnected holes which are open to a surface of the resinous porous article; and a lubricating oil impregnated into the resinous porous article. The interconnected holes are formed by molding a resin containing a pore-forming substance into a molding and extracting a part of the pore-forming substance from the molding with a solvent which dissolves the pore-forming substance and does not dissolve the resin.

The above-described interconnected holes mean pores continuous with one another. The interconnected hole porosity means the ratio of the total volume of the interconnected holes to the volume of a resinous article. In the present invention, the extraction of a part of the pore-forming substance includes a case in which in the extraction of the entire extractable pore-forming substance leading to the surface of the resinous article, a part of the pore-forming substance does not lead to the surface of the resinous article and remains inside the resinous article without being extracted therefrom.

The interconnected hole porosity of the resinous porous article is not more than 30%.

The pore-forming substance has a higher melting point than a temperature at which the resin is molded.

The pore-forming substance comprises both of a substance having a melting point higher than a temperature at which the resin is molded and a substance having a melting point lower than a temperature at which the resin is molded.

The pore-forming substance is water-soluble.

The pore-forming substance is an alkali compound.

A method of the present invention for producing a resinous oil-retaining article includes the steps of mixing a pore-forming substance with a resin; molding the resin containing the pore-forming substance into a molding; extracting a part of the pore-forming substance from the molding with a solvent which dissolves the pore-forming substance and does not dissolve the resin; and impregnating the obtained resinous porous article with lubricating oil.

In the extracting step, a part of the pore-forming substance is extracted in such a way that the interconnected hole porosity of the resinous porous article is not more than 30%.

When the mixing amount of the pore-forming substance is not more than 40 vol %, all or apart of the pore-forming substance leading to the surface of the molding is extracted, whereas when the mixing amount of the pore-forming substance is more than 40 vol %, a part of the pore-forming substance leading to the surface of the molding is extracted.

An ASTM 1508 dumbbell specimen (thickness: 2 mm) was formed to examine the relationship between the mixing amount of the pore-forming substance and the interconnected hole porosity.

As the matrix resin, polyethylene LUBMER L-5000 produced by Mitsui Chemical Co., Ltd. was used. As the pore-forming substance, sodiumbenzoate (average diameter: about 100 μm) was used. The mixing amount of the sodium benzoate was set to five kinds, namely, 20 vol %, 30 vol %, 40 vol %, 50 vol %, and 60 vol %.

After the matrix resin and the pore-forming substance were melted and kneaded at 180° C. by using Labo Plastomill, dumbbells each having a thickness of 2 mm were formed by compression molding. By immersing the obtained dumbbells for 20 hours in hot water having a temperature of 80° C., the pore-forming substance was extracted to make the dumbbells porous. The interconnected hole porosity of each specimen was measured. The results are shown in FIG. 1. In FIG. 1, the abscissa axis shows the mixing amount (vol %) of the pore-forming substance, whereas the ordinate axis shows the interconnected hole porosity (%). The interconnected hole porosity was computed based on an equation (1) which will be described later.

FIG. 1 indicates that when the mixing amount of the pore-forming substance is not more than 40 vol % for the total volume of the resin and the pore-forming substance in producing the resinous porous article, the interconnected hole porosity is lower than the volume ratio of the pore-forming substance mixed with the matrix resin. This is considered to be because pores which are not open to the surface of the resinous porous article are not extracted but present in the resin.

When the mixing amount of the pore-forming substance is not less than 40 vol % for the total volume of the resin and the pore-forming substance, the volume ratio of the pore-forming substance mixed with the matrix resin and the interconnected hole porosity are almost equal to each other. Thus it is considered that nearly all pores are open to the surface of the resinous porous article and that the pore-forming substance is all extracted in an extraction process.

When the interconnected hole porosity of the resinous oil-retaining article exceeds 30%, the oil impregnation is sufficient. But the resinous oil-retaining article has a problem that when the resinous oil-retaining article is used for a retainer of a bearing under a condition that the bearing rotates at a high speed or when the resinous oil-retaining article is used for a sliding bearing under a condition that a PV value is high, the resinous oil-retaining article has an insufficient mechanical strength.

The present invention has been made based on the above-described finding. That is, in the present invention, importance is given to the balance between the mechanical strength of the resinous oil-retaining article and the oil-retaining performance thereof when the resinous oil-retaining article is used for a desired object. Further in the present invention, according to the mixing amount of the pore-forming substance, the interconnected hole porosity is controlled by partly extracting a proper amount of the pore-forming substance.

Effect of the Invention

The resinous oil-retaining article of the present invention is excellent in the utilization efficiency of the lubricating oil contained therein. The resinous oil-retaining article is produced by impregnating the matrix resin with the lubricating oil after pores are formed therein, but not by impregnating molded resinous porous article. Therefore the resin and the oil can be arbitrarily selected according to a use and a specification.

A part of the pore-forming substance is extracted in such a way that the interconnected hole porosity is not more than 30%. Therefore the resinous oil-retaining article contains the resin at a high percentage and is excellent in mechanical strength. Thus the resinous oil-retaining article can be preferably utilized for a retainer of a bearing under a condition that the bearing rotates at a high speed or for a sliding bearing under a condition that the PV value is high.

As the pore-forming substance which is used in producing the resinous oil-retaining article, not the acidic salt, but the alkali compound such as the organic alkali metal salt serving as a rust preventive agent is used. Thereby in using the resinous oil-retaining article for the bearing and the like around which iron and steel are present, it is possible to prevent the iron and steel from being corroded, even though the pore-forming substance remaining in the oil-retaining article bleeds out.

BEST MODE FOR CARRYING OUT THE INVENTION

The resinous oil-retaining article of the present invention is obtained by molding a resin containing a pore-forming substance, particularly a resin containing an alkali pore-forming substance, into a molding; extracting a part of the pore-forming substance from the molding in such a way that the interconnected hole porosity of the resinous porous article is set to not more than 30% by using a solvent which dissolves the pore-forming substance and does not dissolve the resin; and impregnating the resinous porous article having interconnected holes with a lubricating oil or the like.

The interconnected hole porosity, the resin composing the resinous oil-retaining article of the present invention, the pore-forming substance, the molding method, and the method of extracting the pore-forming substance are described in detail below.

When the porosity of a porous material having pores therein is considered, let it be supposed that the porous material is composed of an aggregate of a plurality of spheres and pores which form interspaces present in gaps between the spheres. As a form of most densely packing a sphere by a point contact, a face-centered cubic lattice and a hexagonal closest packing are known. The packing percentage thereof is calculated by (volume of sphere÷volume of circumscribed cube)÷(height of equilateral triangle÷base)÷(height of regular tetrahedron÷one side) and is both 74%. The porosity defined as (100-packing percentage) is 26%.

The above-described computation is made on the assumption that spheres having the same size are packed. When spheres having a plurality of sizes are packed, the packing percentage is higher and the porosity becomes lower than those of the hexagonal closest packing.

When powdery spherical resin particles are compression molded and then sintered, point contact is impossible but the spherical resin particles deform and make face contacts. Therefore the packing percentage is higher and the porosity becomes lower than those of the hexagonal closest packing. Thus the porosity of the conventional sintered resinous article is up to about 20%.

The definition of the interconnected hole porosity used in the present invention is almost the same as that of the above-described porosity and means the porosity when pores are continuous. That is, as described above, the interconnected hole porosity means the ratio of the total volume of the pores continuous with one another to the volume of the resinous article.

More specifically, the interconnected hole porosity is calculated by the method shown by an equation (1) in "numerical equation 1".

[Numerical Equation 1]

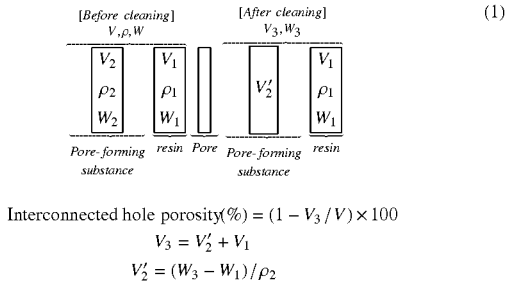

$$\text{Interconnected hole porosity}(\%) = (1 - V_3/V) \times 100$$
$$V_3 = V'_2 + V_1$$
$$V'_2 = (W_3 - W_1)/\rho_2$$

In the above-described equation 1, the meanings of each reference symbols are shown below:
V: Volume of molding before cleaning
ρ: Density of molding before cleaning
W: Weight of molding before cleaning
$V_1$: Volume of resinous powder
$\rho_1$: Density of resinous powder
$W_1$: Weight of resinous powder
$V_2$: Volume of pore-forming substance
$\rho_2$: Density of pore-forming substance
$W_2$: Weight of pore-forming substance
$V_3$: Volume of resinous porous article after cleaning
$W_3$: Weight of resinous porous article after cleaning
$V'_2$: Volume of pore-forming substance remaining in resinous porous article after cleaning As resins of the present invention, it is possible to use resinous powder and a pellet of thermoplastic resin, thermosetting resin, elastomer or rubber. When the resinous powder and the pellet are molded by melting them, they are kneaded together with the pore-forming substance. Therefore the particle diameter and configuration of the resinous powder and the pellet are not specifically limited. When the resin is dry-blended and molded by compressing them, the diameter thereof is preferably 1 to 500 μm.

As the thermoplastic resin or the thermosetting resin, it is possible to list polyethylene resin such as low-density polyethylene, high-density polyethylene, ultra-high-molecular-weight polyethylene; modified polyethylene resin, water-cross-linked polyolefin resin, polyamide resin, aromatic polyamide resin, polystyrene resin, polypropylene resin, silicone resin, urethane resin, polytetrafluoroethylene resin, chlorotrifluoroethylene resin, tetrafluoroethylene-hexafluoropropylene copolymer resin, tetrafluoroethylene-perfluoroalkyl vinyl ether copolymer resin, vinylidene fluoride resin, ethylene-tetrafluoroethylene copolymer resin, polyacetal resin, polyethylene terephthalate resin, polybutylene terephthalate resin, polyphenylene ether resin, polycarbonate resin, aliphatic polyketone resin, polyvinyl pyrrolidone resin, polyoxazoline resin, polyphenylene sulfide resin, polyether sulfone resin, polyether imide resin, polyamide imide resin, polyether ether ketone resin, thermoplastic polyimide resin, thermosetting polyimide resin, epoxy resin, phenol resin, unsaturated polyester resin, vinyl ester resin. It is also possible to exemplify mixtures, namely, polymer alloys each consisting of not less than two kinds of the above-described synthetic resins.

Of the above-described resins, those applicable to an industrial use such as parts of cars, mechanical parts, electric and electronic parts are preferable. The following resins are preferable: engineering resin having a tensile strength not less than 49 MPa, a bending modulus of elasticity not less than 1.9 GPa, and a heat resistance (thermal deformation temperature: 18.6 kg/cm$^2$) not less than 100° C.; special engineering resin or super-engineering resin which has a higher heat resistance than the above-described engineering resin and can be used for a long time at a temperature higher than 150° C.; and resin which is particularly excellent in its mechanical properties such as its sliding property or in its thermal properties and is thus applicable to the industrial use.

As examples of resins that can be used in the present invention, polyether ether ketone resin, polyphenylene sulfide resin, polyamide imide resin, thermoplastic polyimide resin, thermosetting polyimide resin, polyamide 9T resin, epoxy resin, polytetrafluoroethylene resin, tetrafluoroethylene-perfluoroalkyl vinyl ether copolymer resin, unsaturated polyester resin, and ultra-high-molecular-weight polyethylene are listed.

As the elastomer or the rubber, it is possible to exemplify vulcanized rubbers such as acrylonitrile butadiene rubber, isoprene rubber, styrene rubber, butadiene rubber, nitrile rubber, chloroprene rubber, butyl rubber, acrylic rubber, silicone rubber, fluororubber, ethylene propylene rubber, chlorosulfonated polyethylene rubber, chlorinated polyethylene rubber, and epichlorohidrin rubber; and thermoplastic elastomers such as polyurethane elastomer, polyester elastomer, polyamide elastomer, polybutadiene elastomer, and soft nylon elastomer.

As the pore-forming substance usable in the present invention, it is possible to use any substances which can be extracted from the resinous article obtained by molding a resin containing a pore-forming substance into a molding, with a solvent which dissolves a pore-forming substance and does not dissolve a resin.

It is preferable that the pore-forming substance consists of an inorganic salt compound, an organic salt compound or a mixture of these compounds. A water-soluble substance which makes it easy to perform the cleaning extraction step is preferable. An alkali substance is favorable. A weak alkali substance that can be used as a rust preventive agent is more favorable. As weak alkali salts, organic alkali metal salts, organic alkali earth metal salts, inorganic alkali metal salts, and inorganic alkali earth metal salts are listed. It is preferable to use the organic alkali metal salts and organic alkali earth metal salts because these salts are soft and hardly damage a rolling surface and a sliding surface, even when an unextracted portion of the pore-forming substance drops. These metal salts can be used singly or by mixing not less than two kinds thereof with each other. It is preferable to use water-soluble weak alkali salts because they allow the use of inexpensive water as a solvent for cleaning use and facilitate processing of waste water in forming pores.

As water-soluble organic alkali metal salts that can be preferably used in the present invention, it is possible to list sodiumbenzoate (melting point: 430°), sodiumacetate (melting point: 320°), sodium sebacate, (melting point: 340°), sodium succinate, sodium stearate. The sodium benzoate, the sodium acetate, and the sodium sebacate are especially preferable because they have a high melting point respectively, are compatible with many kinds of resins, and have high water solubility.

As the inorganic alkali metal salt, it is possible to list potassium sulfate, potassium carbonate, sodium carbonate, sodium silicate, sodium triphosphate, sodium metaphosphate, sodium pyrophosphate, sodium molybdenum, potassium molybdenum, and sodium tungstate. Of these inorganic alkali metal salts, the potassium sulfate, the potassium carbonate, the sodium carbonate, the sodium silicate, the sodium triphosphate, the sodium pyrophosphate, and the sodium metaphosphate are especially preferable because these inorganic alkalimetal salts have a high melting point, are compatible with many kinds of resins, and have high water solubility.

The pore-forming substance can be used as a mixture of a substance having a melting point higher than temperatures at which the above-described resins are molded and a substance having a melting point lower than the temperatures at which the above-described resins are molded.

As the substance having the melting point lower than the temperatures at which the above-described resins are molded, pentaerythritol, boric acid (171° C.), and the like are listed.

It is preferable that the particle diameter of the pore-forming substance is controlled to 1 to 500 μm.

The ratio of the pore-forming substance to the total amount of the resinous powder, the pore-forming substance, and other components including a filler is set to favorably not less than 30 vol %. If the ratio of the pore-forming substance is less than 30 vol %, it is difficult for pores of the porous article to be interconnected to each other. That is, the oil amount is insufficient. Even when the mixing amount of the pore-forming substance is large, only a part of the pore-forming substance is extracted by suppressing the interconnected hole porosity to not more than 30%. Therefore the pore-forming substance which has remained inside the resin operates as a reinforcing material. Thereby the porous article has a low extent of drop in its mechanical strength.

A filler insoluble in the solvent which is used to extract the pore-forming substance may be added when mixing. For example, when water is used as the solvent, glass fiber, carbon fiber or the like may be added to the resin to improve the mechanical strength of the porous article.

The method of mixing the resinous material and the pore-forming substance with each other is not specifically limited, but kneading methods such as dry blend, a melting kneading method, and the like generally used are applicable.

Further it is possible to use a method of dissolving the pore-forming substance in the liquid solvent to obtain a transparent solution, dispersedly mixing the resinous powder in the transparent solution, and thereafter removing the liquid solvent. By dissolving the pore-forming substance in the liquid solvent and dispersedly mixing the resinous powder with the pore-forming substance, pores of the resinous porous article become interconnected pores with the pores uniformly distributed after the pore-forming substance is extracted and further it is possible to form pores having diameters smaller than the particle diameter of an original pore-forming substance.

The method of dispersedly mixing the resinous powder is not specifically limited, provided that the mixing can be accomplished in the solution, but it is possible to use a ball mill, an ultrasonic dispersing machine, a homogenizer, a juicer mixer, a Henschel mixer, and the like. To restrain the separation of the dispersion solution, addition of a small amount of a surface active agent is effective. In mixing the resin with the transparent solution in which the pore-forming substance dissolves, the amount of the solvent should be secured to completely dissolve the pore-forming substance by the mixing. In this case, as the method of removing the solvent, it is possible to use a heating evaporation method, a vacuum evaporation method, a bubbling method to be carried out by using nitrogen gas, a dialyzing method, and a freeze-drying method. It is preferable to remove the liquid solvent by the heating evaporation method, because this method can be easily carried out, and equipment for carrying out this method is inexpensive.

In molding the mixture of the resin and the pore-forming substance, it is possible to adopt any desired molding methods such as a compression molding method, an injection molding method, an extrusion molding method, a blow molding method, a vacuum molding method, a transfer molding method, and the like. To improve workability before performing a molding operation, the mixture may be processed into a pellet or a prepreg.

The pore-forming substance is extracted from the obtained molding by cleaning the molding with a solvent which dissolves the pore-forming substance and does not dissolve the above-described resin. As the cleaning method, it is possible to list a method of immersing the molding in the solvent for a predetermined period of time, a method of immersing the molding in the solvent for a predetermined period of time with the solvent being stirred, a method of immersing the molding in the solvent for a predetermined period of time, with the solvent being vibrated by supersonic waves, and a method of pouring the solvent to the molding.

When the mixing amount of the pore-forming substance is not more than 40 vol %, all (except for pore-forming substance not leading to the surface of the molding) or a part of the pore-forming substance leading to the surface of the molding is extracted in such a way that the interconnected hole porosity is not more than 30%.

When the mixing amount of the pore-forming substance exceeds 40 vol %, almost all of the pore-forming substance leads to the surface of the molding. Therefore only a part of the pore-forming substance is extracted in such a way that the interconnected hole porosity is not more than 30%.

In the case of the partial extraction, the extraction amount is controlled by adjusting cleaning and immersing periods of time.

As the above-described solvent, it is possible to use water and solvents compatible with water, for example, an alcohol solvent, an ester solvent, and a ketone solvent. These solvents are appropriately selected according to the kind of the resin and the pore-forming substance and the above-described condition. These solvents may be used singly or by mixing not less than two kinds thereof with each other. It is preferable to use water, because processing of waste water can be performed easily and at a low cost.

By performing the above-described extraction process, the resinous porous article in which the pores are formed at portions where the pore-forming substance has been filled is obtained.

The resinous oil-retaining article of the present invention is obtained by impregnating the above-described resinous porous article with lubricating oil or the like.

The kind of the lubricating oil which impregnates the resinous porous article is not specifically limited, but it is possible to list mineral oil (paraffin, naphthene) and synthetic lubricating oil (poly-α-olefin (PAO), ester oil, cyclopentane oil, fluorine oil (PFPE), silicone oil, phenyl ether oil). As needed, additives such as an antioxidant, an extreme-pressure agent, a friction-adjusting agent, and a rust preventive agent may be added to the lubricating oil.

As the impregnating method, a method capable of impregnating the inside of the resinous porous article can be used. A decompression impregnation of immersing the resinous porous article in an impregnating bath filled with the lubricating oil and thereafter impregnating the resinous porous article by decompression is preferable. When silicone oil having a high viscosity is used, the resinous porous article can be impregnated by compression. Impregnation may be performed in combination of compression and decompression.

EXAMPLES

Examples 1 Through 5 and Comparative Examples 1 and 2

Powder of ultra-high-molecular-weight polyethylene (LUBMER L5000 produced by Mitsui Chemicals, Inc., melting point: 136° C.) and powder of sodium benzoate (reagent produced by Wako Pure Chemical Industries, Ltd., melting point: 430° C.) were used at the mixing ratio shown in table 1. After the powders were mixed with each other for four minutes and meltingly kneaded by using Labo Plastomill (180° C., 50 r/m), an ASTM dumbbell (thickness: 2 mm) of each of the examples and the comparative examples was formed by using a thermal compression molding method (180° C.×30 minutes). To extract the entire pore-forming substance leading to the surface of the molding, the molding of each of the examples 1, 2 and the comparative examples 1, 2 was immersed for 20 hours in hot water having a temperature of 80° C. to elute the powder of the sodium benzoate which is the pore-forming substance.

In the example 5, the pore-forming substance was extracted by immersing it in the hot water having the temperature of 80° C. for five hours. Thereby a part of the powder of the sodium benzoate was eluted. In the examples 3 and 4, an extraction period of time was so controlled that the interconnected hole porosity was not more than 30%. More specifically, the molding was immersed in the hot water having the temperature of 80° C. for three hours to elute a part of the powder of the sodium benzoate which is the pore-forming substance.

After the pore-forming substance of each of the examples and the comparative examples was extracted, the moldings were dried for eight hours at 100° C. to obtain a porous article of each of the examples and the comparative examples. Each of the porous articles was left at rest in a beaker containing synthetic lubricating oil PAO (Shinfluid 801 produced by Nippon steel Chemical Co., Ltd.) to impregnate the porous articles with the lubricating oil in a vacuum bath.

The interconnected hole porosity and tensile strength of each porous article were measured before it was impregnated with the oil. The oil content and coefficient of friction thereof were also measured after it was impregnated with the oil. The coefficient of friction was measured in a pin-on-disk test shown below. The results are shown in table 1.

Friction Test

To examine the frictional wear property of the obtained specimen, the pin-on-disk test was conducted under the following test conditions.

Surface pressure: 3 MPa, Speed: 4.2 m/minute, Period of time: 20 hours

Specimen: φ3 mm×13 mm, Raceway diameter: 23 mm

Mating material: φ33 mm×φ6 mm, Aluminum alloy A5056 (surface roughness Ra: 0.5 μm)

Comparative Example 3

The powder of the ultra-high-molecular-weight polyethylene (Miperon XM220 produced by Mitsui Chemicals, Inc.), polyethylene wax (Suntight S produced by Seiko Chemical Co., Ltd.), grease:Albania S, and mineral oil were mixed with one another at a volume ratio of 20:5:35:40. The mixture was placed in the ASTM dumbbell (thickness: 2 mm) to compression-sinter it at 150° C. for 30 minutes.

Comparative Example 4

The powder of the ultra-high-molecular-weight polyethylene (Miperon XM220 produced by Mitsui Chemicals Inc.) was placed in the ASTM dumbbell (thickness: 2 mm) to compression-sinter it at 150° C. for 30 minutes.

The tensile strength of the porous article of each of comparative examples 3, 4 was measured. The oil content and coefficient of friction thereof were also measured after it was impregnated with the oil. The coefficient of friction was measured in the pin-on-disk test shown above. The results are shown in table 1.

TABLE 1

|  | Example | | | | | Comparative example | | | |
| --- | --- | --- | --- | --- | --- | --- | --- | --- | --- |
|  | 1 | 2 | 3 | 4 | 5 | 1 | 2 | 3 | 4 |
| Pore-forming substance (vol %) | 30 | 35 | 40 | 50 | 60 | 40 | 50 | — | — |
| Extraction period of time (hour) | 20 | 20 | 3 | 3 | 5 | 20 | 20 | — | — |
| Interconnected hole porosity (%) | 12 | 25 | 30 | 30 | 40 | 38 | 50 | — | — |
| Tensile strength (Mpa) | 21 | 17 | 15 | 16 | 16 | 12 | 10 | 3 | 25 |
| Oil content (%) | 11 | 24 | 29 | 29 | 38 | 37 | 48 | 70 | — |
| Coefficient of friction | 0.05 | 0.05 | 0.05 | 0.05 | 0.05 | 0.05 | 0.05 | 0.05 | 0.25 |

The specimen of each example had a strength not less than 50% of that of a base material (comparative example 4), had sufficiently low coefficient of friction, and showed preferable lubricating property. On the other hand, although the specimen of the comparative example 3 had excellent frictional property, it had a very low strength. Thus it cannot be used as a constituent material for the retainer or the like.

INDUSTRIAL APPLICABILITY

Because the resinous oil-retaining article of the present invention is excellent in the utilization efficiency of the lubricating oil and high in its mechanical strength, it can be preferably used for a retainer and the like of a rolling bearing and a sliding bearing.

Figure 1:
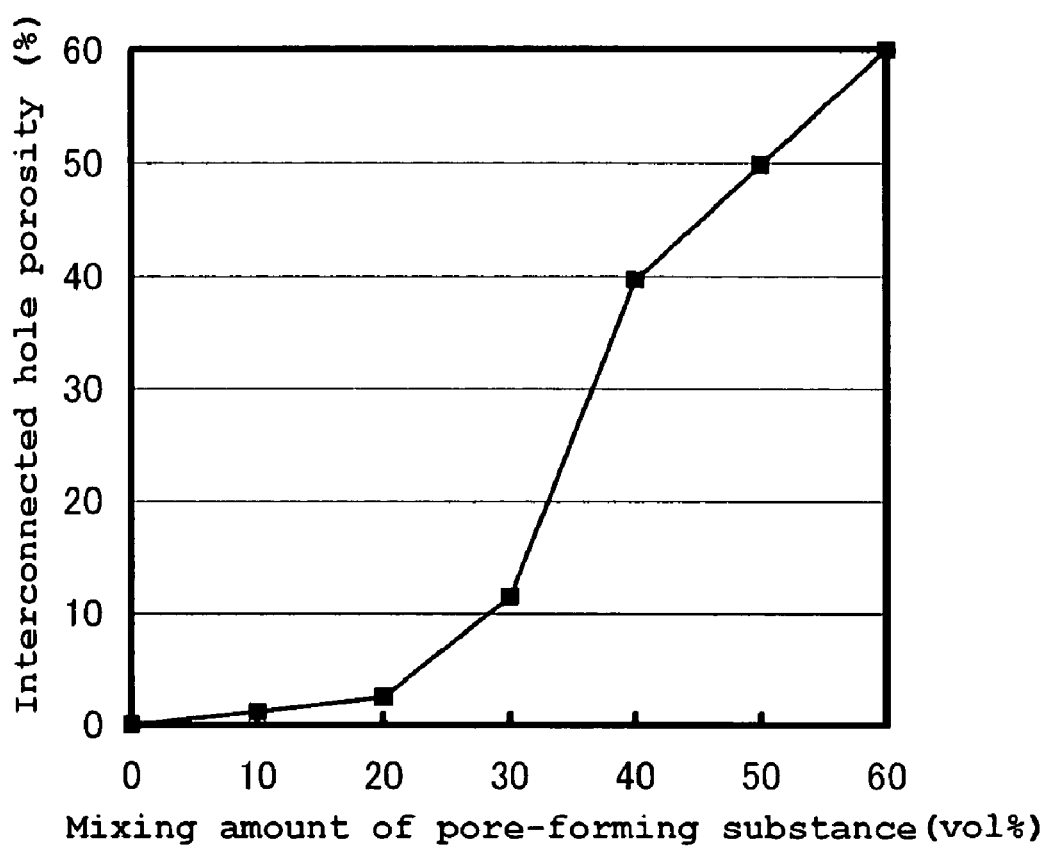
FIG. 1 shows the relationship between the mixing amount of a pore-forming substance and an interconnected hole porosity.

The invention claimed is:

1. A resinous oil-retaining article comprising:
a resinous porous article having interconnected holes which are open to a surface of said resinous porous article; and
a lubricating oil impregnated into said resinous porous article,
wherein said interconnected holes are formed by molding a resin containing a pore-forming substance that is an alkali compound at a mixing amount of said pore-forming substance of not more than 40 vol % based on the total volume of said resin and said pore-forming substance into a molding and extracting a part of said pore-forming substance from said molding with a solvent which dissolves said pore-forming substance and does not dissolve said resin,
wherein an interconnected hole porosity of said resinous porous article is not more than 30%
wherein a part of said pore-forming substance remains in said resinous oil-retaining article.

2. The resinous oil-retaining article according to claim 1, wherein said pore-forming substance has a higher melting point than a temperature at which said resin is molded.

3. The resinous oil-retaining article according to claim 1, wherein said pore-forming substance comprises both a substance having a melting point higher than a temperature at which said resin is molded and a substance having a melting point lower than a temperature at which said resin is molded.

4. The resinous oil-retaining article according to claim 1, wherein said pore-forming substance is water-soluble.

5. The resinous oil-retaining article according to claim 1, wherein said pore-forming substance is a weak alkali substance serving as a rust preventive agent.

6. The resinous oil-retaining article according to claim 1, wherein said alkali compound is at least one compound selected from among sodium benzoate, sodium acetate, sodium sebacate, sodium triphosphate, sodium pyrophosphate, and potassium carbonate.

7. The resinous oil-retaining article according to claim 1, wherein said alkali compound is at least one compound selected from among an organic alkali metal salt and an organic alkali earth metal salt.

8. The resinous oil-retaining article according to claim 1, utilized for a retainer of a bearing.

9. A retainer of a bearing, comprising the resinous oil-retaining article according to claim 1.

10. The retainer according to claim 9, wherein said bearing is a rolling bearing.

11. The retainer according to claim 9, wherein said bearing is a sliding bearing.

12. A method of producing a resinous oil-retaining article, comprising the steps of:
mixing a pore-forming substance that is a alkali compound with a resin at a mixing amount of said pore-forming substance of not more than 40 vol % based on the total volume of said resin and said pore-forming substance;
molding said resin containing said pore-forming substance into a molding;
extracting a part of said pore-forming substance from said molding with a solvent which dissolves said pore-forming substance and does not dissolve said resin; and
impregnating an obtained resinous porous article with a lubricating oil,
wherein an interconnected hole porosity of said resinous porous article is not more than 30%
wherein a part of said pore-forming substance remains in said resinous oil-retaining article.

* * * * *